July 31, 1928.

C. F. JENKINS 1,679,086

SPIRAL MOUNTED LENS DISK

Filed Jan. 2, 1925

Inventor
C. Francis Jenkins

Witness:
Sybil L. Almand

Patented July 31, 1928.

1,679,086

UNITED STATES PATENT OFFICE.

CHARLES FRANCIS JENKINS, OF WASHINGTON, DISTRICT OF COLUMBIA.

SPIRAL-MOUNTED LENS DISK.

Application filed January 2, 1925. Serial No. 222. REISSUED

This invention relates to apparatus for the transmission of pictures by radio, in which the picture is made up of lines across an approximately flat surface, said lines having varying values.

The principal object of this invention is the design of a simple device which permits of a speed which will cover the entire picture surface within the time of persistence of vision, say, one-twelfth or one-sixteenth of a second.

With these and other objects in view the invention consists of the novel details of construction and combination of parts more fully hereinafter disclosed and particularly pointed out in the claims.

Figure 1:
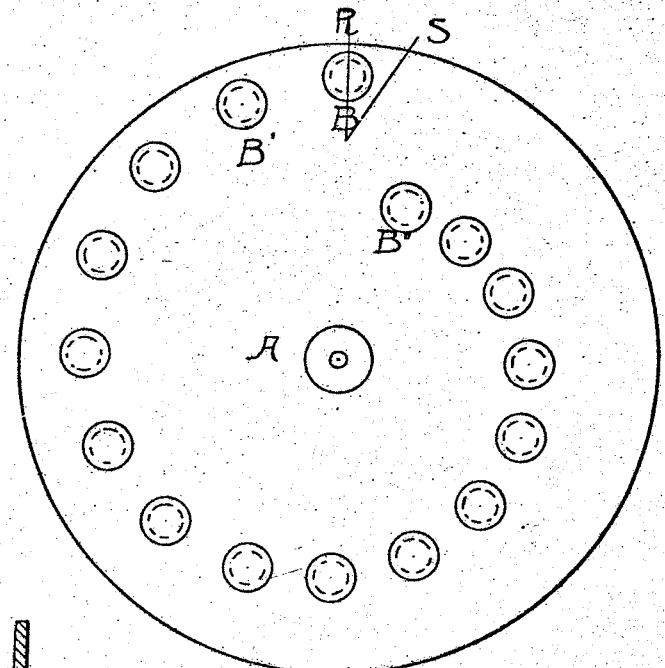
Figure 2:
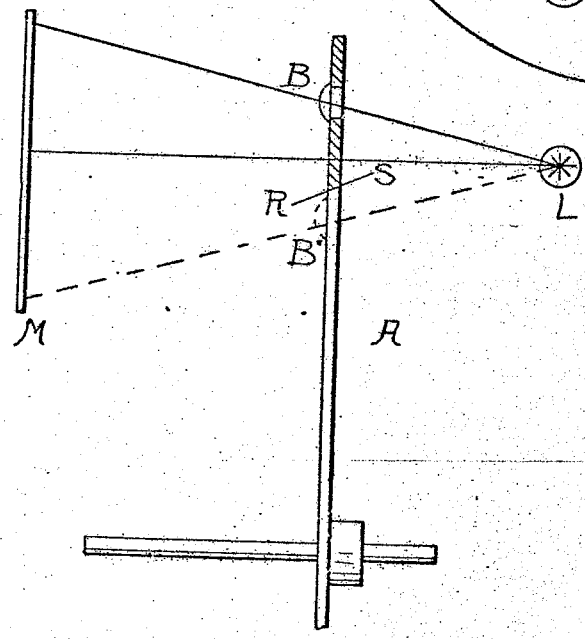

Referring to the accompanying drawing forming a part of this specification, Figure 1 is a front view of the lens-carrier disk, and Figure 2 a schematic drawing showing how it is employed.

In the drawing A is a disk with a plurality of spirally arranged holes therein, over each of which a lens is mounted, as B, B', B", etc. The disk is intended to be rotated between a spot-source of light L, and a picture surface or screen M, shown edge on.

When the lens B is in front of the light the image of the source strikes the screen near the top, as shown in full line; when the lens B" is in position to project, the image will appear on the picture surface near the bottom, as indicated by the dotted line; when other lenses come into position to project, the images fall in successively different positions between these extremes.

It will readily be understood that the rotation of the disk would cause the lenses to travel across the screen from side to side; while the location of the lenses at different radial distances from the axis makes the lateral trips of each lens at different levels, so that the whole picture surface is scanned.

It will also be understood that the disk-mounted lenses could just as well scan a picture surface to be sent as they scan a screen upon which the picture is put, without departing from the spirit of my invention.

What I claim, is—

1. In combination, a stationary picture surface, a stationary light translating element, a rotatable disk interposed between said surface and said element, said disk being provided with a plurality of apertures of large dimensions as compared with an elementary area of the picture surface, and a spherical lens mounted in each aperture for imaging the picture surface and the light translating element each upon the other, said apertures and lenses being so arranged that upon rotation of the disk the lenses pass successively between said surface and said element, and successive images of the light translating element traverse the picture surface by adjacent parallel paths.

2. In combination, a stationary light translating element, and a scanning device consisting of a rotatable disk interposed between the said element and a plane to be scanned, said disk being provided with a plurality of apertures of large dimensions as compared with an elementary area of the scanned plane, and a lens mounted in each aperture, said apertures and lenses being so arranged that upon rotation of the disk the lenses will pass between said plane and said element and successive images of the light translating element traverse the plane by adjacent parallel paths.

In testimony whereof I have affixed my signature.

CHARLES FRANCIS JENKINS.